United States Patent
Horn

[11] Patent Number: 5,911,476
[45] Date of Patent: Jun. 15, 1999

[54] SEAT COVER FOR PROTECTING A MOTOR VEHICLE SEAT

[76] Inventor: Joachim Horn, An der Michelsruh 3, D-34601 Schwalmstadt, Germany

[21] Appl. No.: 08/961,315

[22] Filed: Oct. 30, 1997

[30]     Foreign Application Priority Data

Nov. 7, 1996 [DE] Germany ............... 196-45-999

[51] Int. Cl.⁶ .................................. A47C 27/00
[52] U.S. Cl. ........................ 297/229; 297/228.1
[58] Field of Search ............... 297/219.1, 225, 297/228.1, 229

[56]            References Cited

U.S. PATENT DOCUMENTS

| | | | |
|---|---|---|---|
| 3,695,692 | 10/1972 | Williams | 297/229 |
| 4,676,376 | 6/1987 | Keiswetter | 297/229 X |
| 4,884,839 | 12/1989 | Keiswetter | 297/229 X |
| 5,265,933 | 11/1993 | Croshaw | 297/229 X |
| 5,709,431 | 1/1998 | Horn | 297/229 X |

FOREIGN PATENT DOCUMENTS

| | | |
|---|---|---|
| 0 457 992 A1 | 12/1990 | European Pat. Off. . |
| 0 458 757 A2 | 5/1991 | European Pat. Off. . |
| 2491315 | 4/1982 | France ................ 297/228.1 |
| 1 630 878 | 4/1967 | Germany . |
| 3500928 | 7/1986 | Germany ................ 297/229 |
| 41 32 714 C1 | 10/1991 | Germany . |
| 42 10 232 C2 | 3/1992 | Germany . |
| 1139794 | 7/1965 | United Kingdom . |

*Primary Examiner*—Laurie K. Cranmer
*Attorney, Agent, or Firm*—Thomas, Kayden, Horstemeyer & Risley

[57]          ABSTRACT

A seat cover (1) is shown for protecting a motor vehicle seat (26), the seat cover being made from an at least double-layered piece of plastic, in particular for the single use in car workshops, comprising a front layer (7) extending over and protecting the seating (28) and the backrest surface (30) of the seat (26) and a rear layer (8) connected with the front layer by transverse welding (9, 19) and together with the front layer (7) forming a backrest pocket (6) for the reception of at least a part of the backrest (29) and forming a seat pocket (5) for the reception of at least a part of the seat cushion (27). The rear layer (8) forming part of the seat pocket (5) comprises a protecting strip (12) in U-form formed by a cutout (11) and surrounding the sides of the seat cushion (27), and the part of the front layer (7) adapted to the gap (33) between the backrest (29) and the seat cushion (27) comprises at both sides a protecting element (17) each to cover the link regions (32) of the seat (26).

11 Claims, 5 Drawing Sheets

SEAT COVER FOR PROTECTING A MOTOR VEHICLE SEAT

FIELD OF THE INVENTION

The invention relates to a seat cover for protection of a motor vehicle seat comprising the features of the first part of claim 1. The seat cover comprises a seat pocket surrounding at least part of the seat cushion. The seat cover may be used once or several times in garages during repair, inspections or the like. The seat cover may be used also in particular for the single use in workshops in which vehicle seats are manufactured. The seat cover remains mounted on the manufactured vehicle seat during transport and mounting in a vehicle chassis and even on the way to the dealer.

BACKGROUND OF THE INVENTION

Seat covers made from a film of plastic are put on the vehicle seat to protect the seat from dirtying by workers or other people. Such seat covers are known in garages if a repair or an inspection of the vehicle has to be performed. Even during the first mounting of a vehicle in an automobile factory there is the danger of dirtying the seats. This danger of dirtying even begins at the manufacturer of the vehicle seat and during transport to the automobile factory. This danger lasts when putting the seats to conveyor equipment leading to the assembly line. In addition, the vehicle seats have to be placed into the chassis. During this mounting operation a large number of workers one after the other have contact with the seats. Finally, the assembled vehicle has to be driven away from the assembly line onto trucks or railway waggons for transport and the vehicle has to be moved several times at the dealers place prior to sale and delivery to the individual buyer. For the weight of the vehicle seat is increasing especially due to the mounting of adjusting motors and other elements, it becomes more and more arduous to mount the vehicle seats manually by the worker into the chassis. Mounting by robots is preferred on the assembly line. A robot used for this purposes comprises a mounting plate which is pressed into the gap between the seat cushion and the backrest of the seat, the seat being in normal position. Often the robot is designed to convey and mount the seats in pairs into the interior of the chassis. After mounting the mounting plate is retracted from the gap between the backrest and the seat cushion. Using known seat covers the mounting plate would penetrate the front layer of the seat cover so that the protecting effect of the seat cover is substantially decreased. Experiments have been made by loosening the seat pocket from the seat cushion in order to grip directly into the gap between the backrest and the seat cushion. However, there is the danger or dirtying the seat by the mounting plate of the robot. Even if this dirtying does not happen it means a further step of work to loosen the seat pocket and to put on again the seat pocket after mounting of the seats in the chassis. It is an disadvantage that the vehicle seat is not protected during robot mounting.

Vehicle seats have for 30 to 35 times contact with workers and other persons from the manufacture of the seat by the provider up to the delivery of the vehicle to the buyer, so that there is a reasonable danger of dirtying. To counteract this danger of dirtying the described seat covers made from plastic film are known, which often are put on the seat at the place of the seat manufacturer, at the latest at the place of the vehicle manufacturer. These seat covers are put on the seats, in particular the seat of the driver, and removed before delivery to the buyer. Such seat covers for new cars do not substantially differ from such seat covers which are used during repair or inspection. They may be made from comparatively thicker plastic film serving for the heavier use.

A seat cover of the type described above is known from DE 42 10 232 C2. The seat cover has a pocket on each of its end regions, whereby the seat pocket serves to receive a part of the seat cushion and the backrest pocket is adapted to receive a part of the backrest of the seat. The seat cover has a front layer, which is designed longer than the sum of the usable length of the backrest and the seat cushion. Due to this longer designed front layer it is possible to fold the front layer in this region generating a fixing fold and to clamp this fixing fold in the gap between backrest and seat cushion. The fixing fold is closed on both sides of the seat. The fixing fold serves mainly for fixing the seat cover in the region of the gap. The fold is clamped by the tension being present usually between backrest and seat cushion. This is advantageous because the part of the front layer protecting the backrest and the part of the front layer covering the seat cushion are held closer and tighter on the seat. There is the further advantage that the danger of displacement of the seat cover is substantially reduced, in particular in the region of the gap, so that there are practically no surfaces of the seat which are not protected. A vehicle seat protected by a seat cover of the described type may be used for robot mounting also using a mounting plate, but without penetrating the front layer. The fixing fold is pressed into the gap between backrest and seat cushion already at the place of the manufacturer of the seat. By doing this the seat cover is fixed additionally on the vehicle seat. The putting in of the mounting plate of the robot at the assembly line gives no variation of the position of the seat cover with respect to the vehicle seat.

A further seat cover is known from DE-B 16 30 878. During its manufacture a tubular film of plastic is cut lengthwise. The thus appearing both edges are displaced from each other and laid down in flat condition on the other material of the tubular film. By doing this a flat double-layered film is formed. The plastic film is folded in the region of both free edges left and right of the direction of production. The folded regions forming a rear layer will be connected with the front layer by transverse welded seams, i.e. weldings running across the direction of production. Thus two pockets are formed which normally differ in depth, the one being adapted to receive the backrest and the other being adapted to receive and surround the seat cushion of the vehicle seat. It is the side of the tubular film or the seat cover respectively which is called the front layer because it is the layer positioned in front when the seat cover is put on the vehicle seat and thus protecting the seating of the seat cushion and the front surface of the backrest. The other layer of the seat cover is called the rear layer because it is the layer which in mounted position protects the rearwardly and downwardly directed parts of the vehicle seat. Such known seat covers surround the vehicle seat more or less loosely. Due to this there is the danger of displacement of the seat cover during use. In the region between the seat cushion and the backrest unprotected surfaces appear being more or less large with the danger of dirtying during use. The seat pocket protects parts of the seat cushion and the backrest pocket protects parts of the backrest. But there remain parts of the surfaces of the seat unprotected. This is especially the case with surfaces in the downwardly directed part of the seat cushion, with surfaces in the link region of the seat, and with surfaces in the lower region of the downwardly directed part of the back of the backrest. These surfaces can be dirtied during use which is clearly to be seen and especially disadvantageous with seats made from light coloured leather.

SUMMARY OF THE INVENTION

It is the object of the invention to provide a seat cover made from plastic film, in particular for the first mounting of a vehicle, which may be manufactured with the use of machines, which can be put on the seat at the place of the seat manufacturer, and which protects the seat better and more complete up to the delivery of the sold vehicle to the buyer.

According to the invention, this is achieved in that the rear layer forming part of the seat pocket comprises a protecting strip in U-form formed by a cutout and surrounding the sides of the seat cushion, and the part of the front layer adapted to the gap between the backrest and the seat cushion comprises at both sides a protecting element each to cover the link regions of the seat.

The invention starts from the idea to provide the seat pocket and other parts of the seat cover with a better protecting effect. For this reason the part of the rear layer forming the seat pocket comprises a protecting strip in U-form extending in the lower region of the seat cushion and covering the sides of the seat cushion. This protecting strip gives not only a protecting effect but at the same time makes better the tight position of the seat cover on the vehicle seat. In addition, protecting elements are provided on both sides to cover the link region of the vehicle seat. The link region is the region in which the link for the pivotable or tiltable backrest on the base of the seat is positioned. This region in particular is in danger for dirtying during mounting of the vehicle seat into the chassis. The protecting elements symmetrically arranged are substantially formed from the material of the front layer which is opened when the seat cover is opened to put it over the vehicle seat. These protecting elements also serve to hold a better position of the seat cover when mounted. The protecting elements increase the effect of the seat pocket, of the backrest pocket, and of the fixing fold against unintentional falling down of the seat cover from a vehicle seat, for example while being conveyed with downwardly directed backrest on conveyor means.

The invention differs from the prior art as far as the spreading of the free edges of the cut tubular film is concerned. To the contrary the edges are not spread, but a folding in lengthwise direction follows so that the material is substantially in four-layered condition when guided in the direction of production.

It is especially useful if the part of the front layer adapted to the gap between the backrest and the seat cushion comprises a fixing fold formed by separating welded seams connecting the front layer, whereby the separating welded seams end with distance to the transverse welded seams thus limiting the protecting elements. The material of the front layer is used for forming the fixing fold on the one hand and for forming the protecting elements on the other hand. The fixing fold is positioned in the middle part only, while the protecting elements are located adjacent the transverse welded seams. The provided separating welded seams serve to separate the material of the front layer in the region of the fixing fold on the one hand and of the two protecting elements on the other hand. A separating welded seam is a welding which connects the two layers of material while at the same time separating regions from adjacent regions and thus an opening occurs depending on the line the welding is performed and waste material is removed. This is necessary for introducing the fixing fold into the gap between the backrest and the seat cushion, while on the other hand the adjacent regions of the front layer form the protecting elements which surround the link regions of the vehicle seat on the outside.

A frictional connection results, if the gap between backrest and seat cushion is narrow enough to clamp the fixing fold. The fixing fold may be connected with the rear layer by a connection means, if the gap is too wide for clamping purposes or if an additional positive locking is desired. A gluing, a welding or the like can be used as connection means. Doing this, the seat cover can be removed from the vehicle seat only after loosening of the positive locking. By these means a sealing of the vehicle seat, a guarantee of origin connected with guaranteed repair if necessary can be realized from the manufacturer of the seat.

The parts of the front layer and of the rear layer adapted to the gap between the backrest and the seat cushion are not connected to each other except by the separating welded seams and transverse welded seams to make the opening motion of the protecting elements possible during opening of the seat cover. The protecting elements can open during mounting of the seat cover on the vehicle seat and take the protecting position.

It is useful if the part of the rear layer forming the backrest pocket is designed longer to cover the part of the seat cushion extending backwardly. Both pockets, the seat pocket on the one hand and the backrest pocket on the other hand are designed longer compared with the prior art pockets. By this lengthening the seat cover in mounted position on the vehicle seat protects the seat surfaces not only the front surface of the seat cushion and the backrest but also the surfaces directed rearwardly, if the vehicle is tested by persons sitting behind. With persons sitting behind the is the danger of dirtying parts of the seat cushion or the backrest directed backwardly by the shoes, in particular with seats made from light coloured leather. Here the lengthened backrest pocket prevents black stripes or the like from shoes.

A perfect surrounding of the link regions of the vehicle seat occurs by the protecting elements, if the part of the rear layer forming the backrest pocket comprises two cutouts surrounding the separating welded seams with distance. In addition, this gives the possibility that the lower part of the rear layer can hang free in downward direction and fulfil its protection effect. In particular, the part of the rear layer forming the backrest pocket can extend to the free end of the fixing fold. By these outcuts a certain freedom between the end of the part of the rear layer forming of the backrest pocket on the one hand and the fixing fold on the other hand occurs, so that the one element may be introduced into and clamped in the gap between backrest and seat cushion, while the other element fulfils its protecting effect on the rearwardly directed part of the vehicle seat.

A simple manufacture is possible if the cutout provided on the part of the rear layer forming the seat pocket and bordering the protecting strip surrounds the separating welded seams with distance. No additional steps have to be taken to position the separating welded seams on two layers of the four-layered material.

The cutout provided on the part of the rear layer forming the seat pocket may end with the free edge of the rear layer. Doing this at the same time a separation of the fixing fold and the protection element results.

The front layer may comprise perforation lines on both sides for putting through the, lock of the belt. Positioning perforation lines on both sides means to open only one perforation line during mounting of the seat cover depending from right or left mounting. The other perforation line remains closed. It is not necessary to manufacture seat covers adapted for right and for left mounting in the vehicle.

The seat pocket and/or the backrest pocket may comprise chamfered corners. Doing this the seat cover fits better with the shape of the vehicle seat having curved surfaces. There is the possibility to design the backrest pocket to be adapted to seats having an integrated headrest. In general the fit of the seat cover in mounted position is increased in the region of the seat pocket and/or the backrest pocket. Overhanging parts of material are prevented which could hinder the mounting and positioning of the seat cover on the vehicle seat.

BRIEF DESCRIPTION OF THE DRAWINGS

Preferred embodiments of the invention are illustrated in more detail in the drawings which show in FIG. 1 is a view to foil of seat covers connected to each other prior to winding to a roll.

While the foregoing specification and drawing describe preferred embodiments of the invention, it will be apparent to those skilled in the art that variations and modifications thereof can be made without departing from the spirit and scope of the invention as set forth in the following claims.

DETAILED DESCRIPTION

Figure 1:
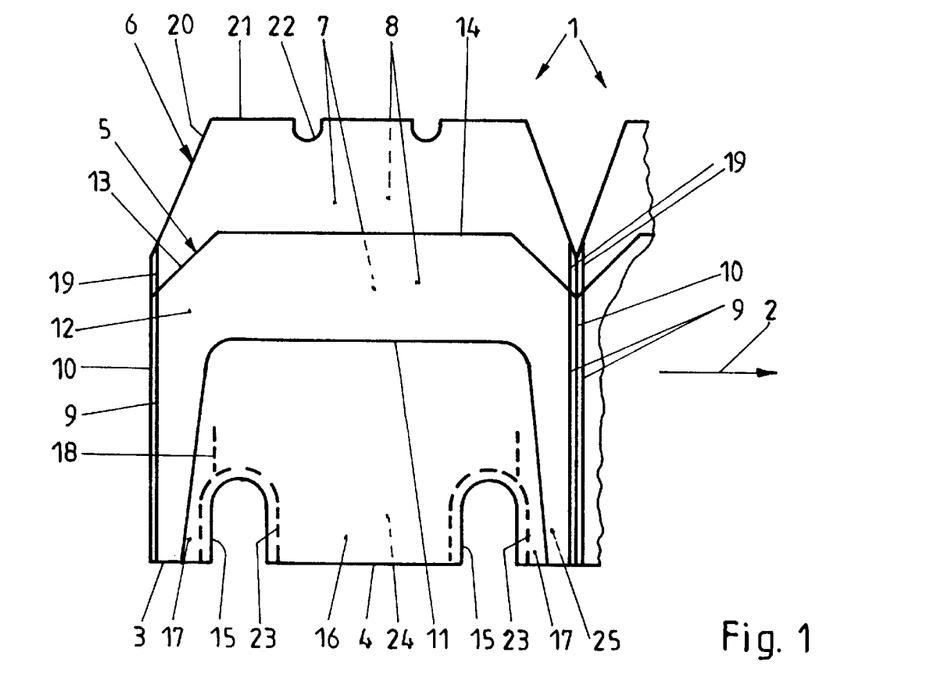

The seat cover 1 illustrated in FIG. 1 is manufactured in form of an endless foil starting from a tubular film of plastic which is cut in lengthwise direction and folded. The direction of travel of the conveyed and treated endless foil is indicated by arrow 2. It is evident that after completing the production the connected seat covers 1 may be wound to a roll, even though FIG. 1 illustrates only one complete seat cover and a part of a further seat cover. The endless foil conveyed in direction of arrow 2 substantially consists four layers one above the other. The single layers are to be seen from FIGS. 2 to 5 one by one.

Figure 2:
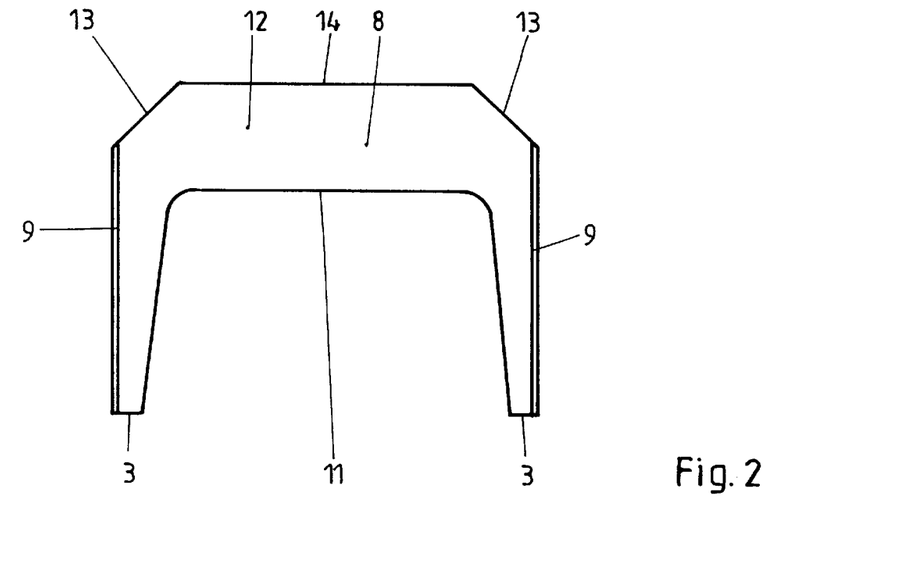
FIG. 2 is a view to the top layer of the seat cover of FIG. 1.
Figure 3:
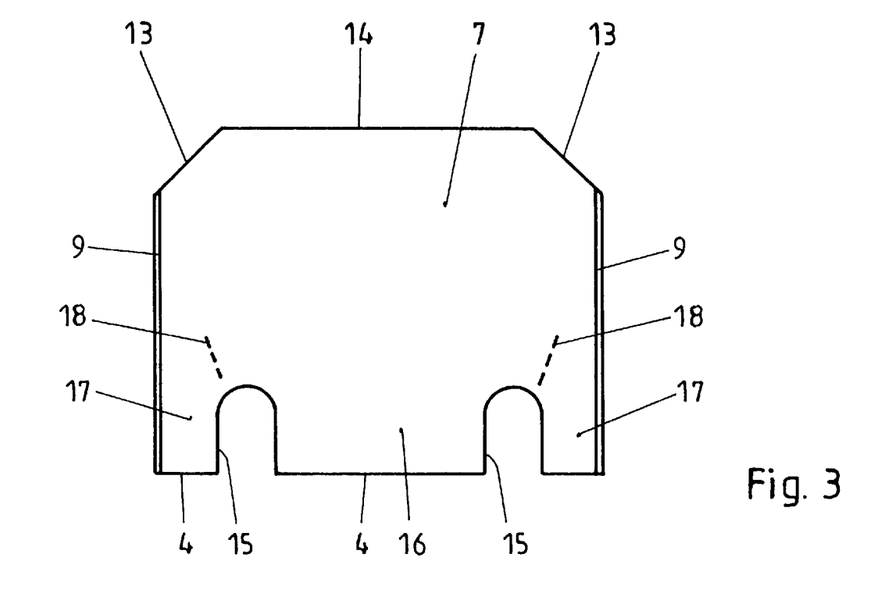
FIG. 3 is a view to the second layer of the seat cover of FIG. 1.

Two free edges 3 and 4 are formed by the cut of the tubular film in lengthwise direction according arrow 2 and by the folding. The tubular film is folded and guided into four layers, whereby the free edges 3 and 4 are in alignment and between two folds, the height of which depends on the desired height of a seat pocket 5 and a backrest pocket 6 respectively. Each pocket is formed from two layers. The two layers in the middle represent a common front layer 7, while the top layer and the lowermost layer are part of a rear layer 8 with respect to the seat. But it is possible also to manufacture the seat covers 1 from four individual layers as shown in FIGS. 2 to 5 instead of forming a common front layer 7 and a rear layer 8. However, it is more advantageous to start from a tubular film cut lengthwise and to use an additional folding step without spreading the film to form the front layer 7 and the rear layer 8. One part of the front layer 7 is connected with one part of the rear layer 8 by transverse welded seams 9 to form the seat pocket 5 as illustrated in FIGS. 1 to 3. These transverse welded seams 9 run across to the conveying direction of arrow 2 and connect the two upper layers only to form the seat pocket 5. Adjacent transverse welded seams 9 of connected seat covers 1 are maintained by a perforation 10 to wind up the foil of seat covers to a roll. This perforation 10 is separated each to take one seat cover 1 from the roll and to mount it to a motor vehicle seat. In case the seat covers 1 form a stack the perforations 10 are replaced by cuts.

As illustrated in FIG. 2 the lower surface of the seat pocket 5 is formed together with a part of the rear layer 8 which in its middle region comprises a cutout 11 in U-form arranged parallel and with distance to the edge 3 and ending at both ends in the edge 3 so that a protecting strip 12 is formed from the rear layer 8 being part of the seat pocket 5. Chamfered corners 13 may be provided by separating welding on the side opposite to the free edge 3.

The total seat pocket 5 is formed from the part of the rear layer illustrated in FIG. 2 and from the part of the front layer 7 illustrated in FIG. 3, while the transverse welded seams 9 which connect these parts are shown in both Figs. Thus, the chamfered corners 13 are part of the front layer also. The free edges 3 and 4 are not connected to each other. On the opposite side there is a connection by the edge 14 which is formed from the tubular film by a folding line or by a separating welding and connecting welding respectively. The part of the front layer shown in FIG. 3 in the region of the edge 4 is provided with two separating welded seams 15 the configuration of which starts from the free edge 4 and ends in it. The separating welded seams 15 are positioned with distance to the transverse welded seams 9 and the perforations 10 respectively. The separating welded seams 15 connect the parts of the front layer 7 shown in FIGS. 3 and 4 to each other. The depth of the separating welded seams 15 is about equal to the measure the front layer is longer than the sum of the length of the seat cushion and the backrest surface to be protected. Thereby the surplus part of the front layer 7 between the two separating welded seams 15 forms a fixing fold 16 to anchor the seat cover 1 mounted on a motor vehicle seat in the gap between the seat cushion and the backrest. At the same time protecting elements 17 are formed from the surplus material by the separating welding seams 15 in the direction to the transverse welded seams 9, i.e. regions consisting of two layers being connected along the separating welded seams 15 and along the free edge 4, but not to the outside. These protecting elements 17 serve to cover the link region of the seat, i.e. the outer region between the backrest and the seat cushion.

The part of the seat cushion 5 shown in FIG. 3 comprises perforation lines 18 each positioned to the sides and adjacent to the separating welded seams 15. Depending on the mounting of the seat cover on a left or right seat in a vehicle the one or the other perforation line 18 is torn to place the lock of the belt, while the other perforation line 18 maintains untorn.

Figure 4:
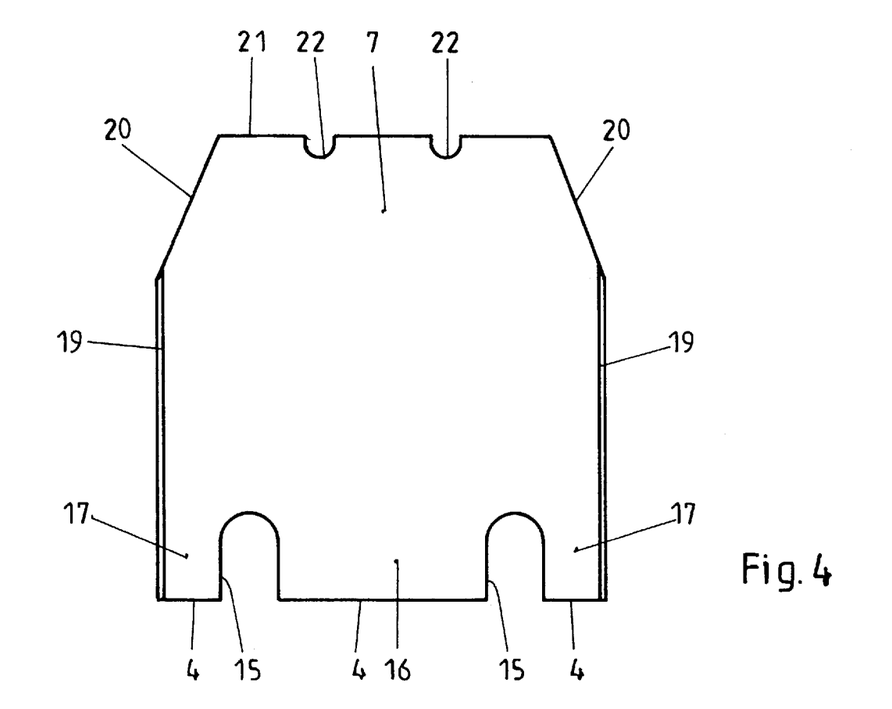
FIG. 4 is a view to the third layer of the seat cover of FIG. 1.
Figure 5:
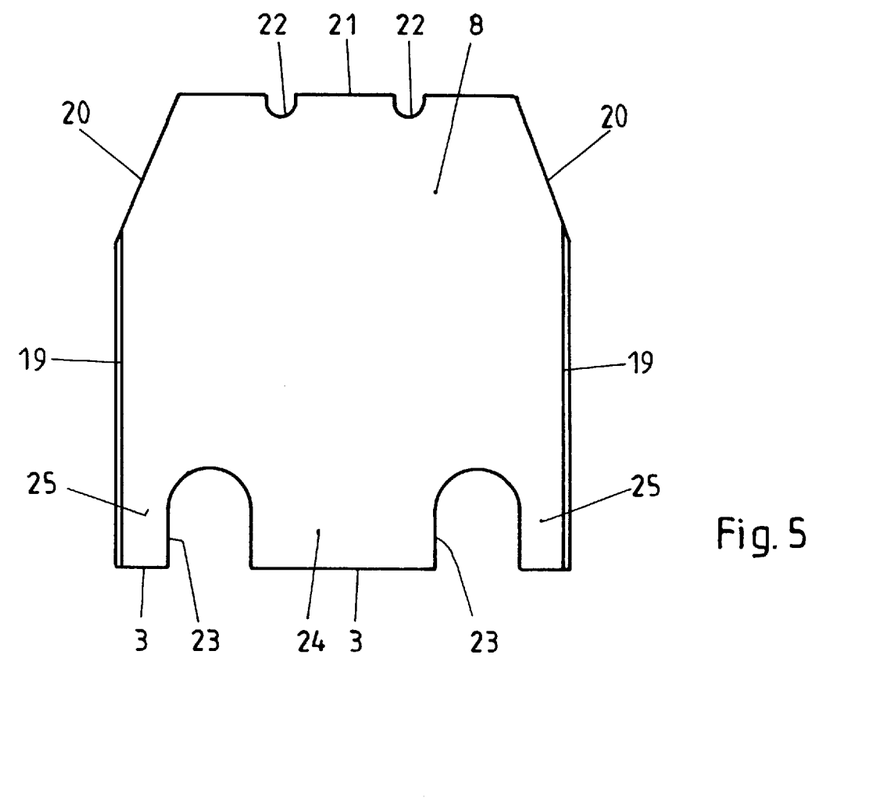
FIG. 5 is a view to the lowermost layer of the seat cover of FIG. 1.
Figure 6:
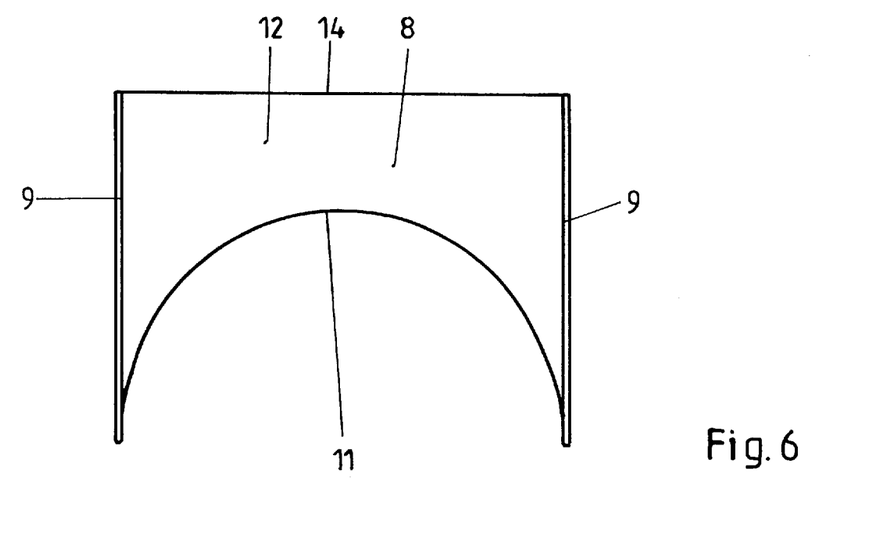
FIG. 6 is a view to the top layer of a second embodiment of the seat cover.

The backrest pocket 6 is formed from the two layers shown in FIGS. 4 and 5, i.e. from a part of the front layer 7 and a part of the rear layer 8. These two layers are connected to each other by transverse welded seams 19 extending across the running direction of arrow 2. The backrest pocket 6 may be provided also with chamfered corners 20 formed by separating welded seams. The front layer 7 and the rear layer 8 are connected also in the region of the chamfered corners 20 and the common edge 21 closing the backrest pocket 6 in U-shape, while the backrest pocket 6 is open on the side of the free unconnected edges 3 and 4 only to be mounted on the seat. The edge 21 may be formed by a fold of the cut tubular film or by separating or connecting welded seams extending in longitudinal direction. Openings 22 may be provided in the region of the edge 21 adapted to receive bars from a headrest of the seat. But it is possible also to design the edge 21 and the chamfered corners 20 so that the backrest pocket 6 can be mounted on a seat having an integrated headrest. The backrest pocket 6 normally has a greater depth than the seat pocket 5, as to be seen especially from FIG. 1.

Figure 9:
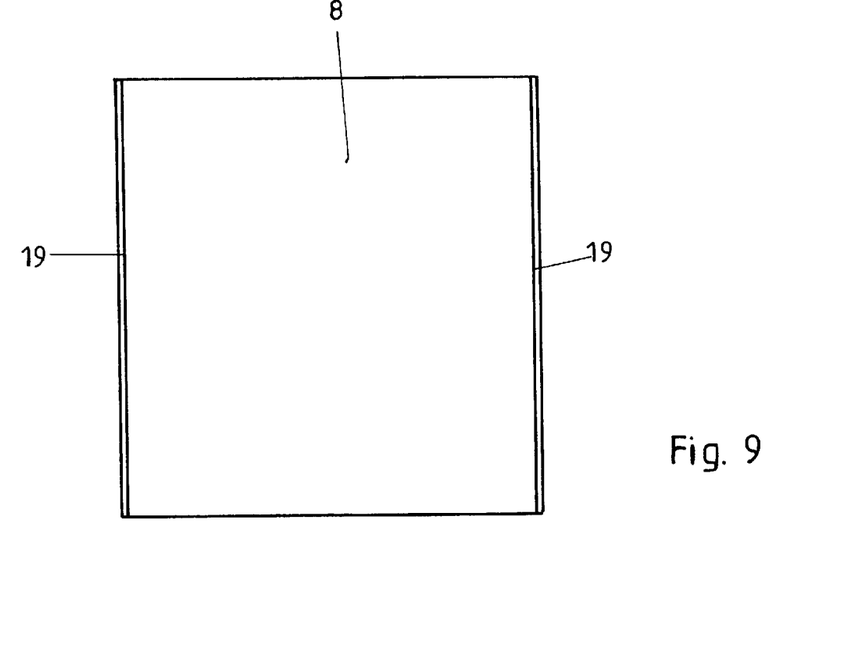
FIG. 9 is a view to the lowermost layer.

The part of the rear layer 8 forming the backrest pocket 6 is provided with cutouts 23 extending from the free edge 3 and adapted to the separating welded seams 15 in shape so that the line of the cutout 23 surrounds the line of the separating welded seam 15 with distance (see FIG. 1). This design is directed to a simple manufacture. Both parts of the front layer 7 as shown in FIGS. 3 and 4 are accessible to arrange the separating welded seams 15 from both sides due to the shape and arrangement of the cutouts 23 and 11 and even though there are positioned four layer on each other. The depth of the backrest pocket 6 in comparison with prior art seat covers is enlarged or designed longer as to be seen from FIGS. 1 and 5. Between the cutouts 23 a protecting curtain 24 is formed which covers and protects the backwards directed part of the seat cushion when mounted on a vehicle seat. In addition protecting flaps 25 are formed by the cutouts 23 protecting the rear portion of the link region of the seat. As illustrated in FIG. 9 the cutouts 23 may be omitted also so that the protecting curtain 24 extends over the entire width of the seat, i.e. the curtain and the flaps forming one part extending to the bottom of the vehicle when the cover is mounted on the seat.

A second embodiment of the invention is illustrated in FIGS. 6 to 9. According to FIG. 6 the cutout 11 on the rear layer 8 is designed differently, the line is not ending in the free edge 3 but adjacent to the transverse welded seam 9 or the perforation 10 respectively. There are no chamfered corners 13 in this embodiment.

Figure 7:
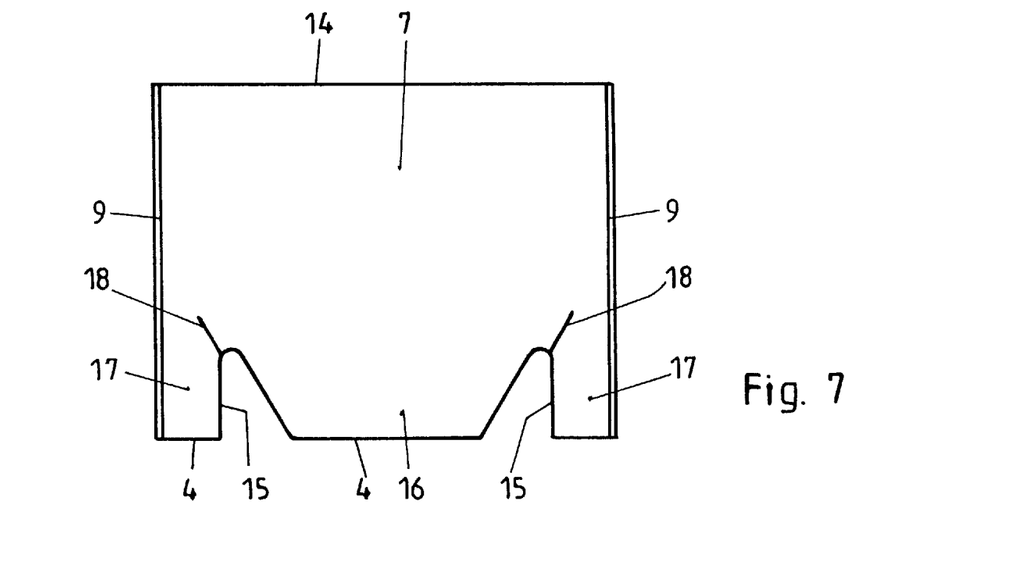
FIG. 7 is the next following layer of the second embodiment.

The separating welded seams 15 of FIG. 7 have a different shape so that the fixing fold 16 has a trapezoidal circumference. The perforation lines 18 may communicate directly with the separating welded seams 15.

Figure 8:
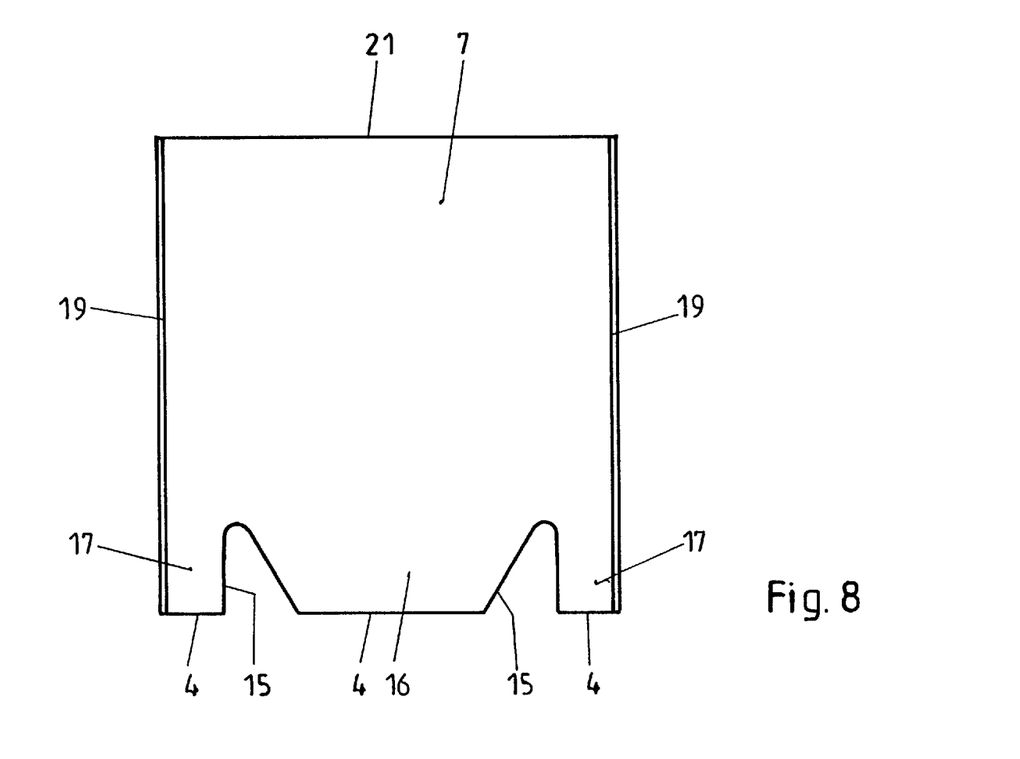
FIG. 8 is a third layer of the embodiment of FIGS. 6 to 9.

The shape of the separating welded seams 15 of FIG. 8 is equal because these regions of the front layer 7 of FIGS. 7 and 8 are connected to each other here.

Figure 10:
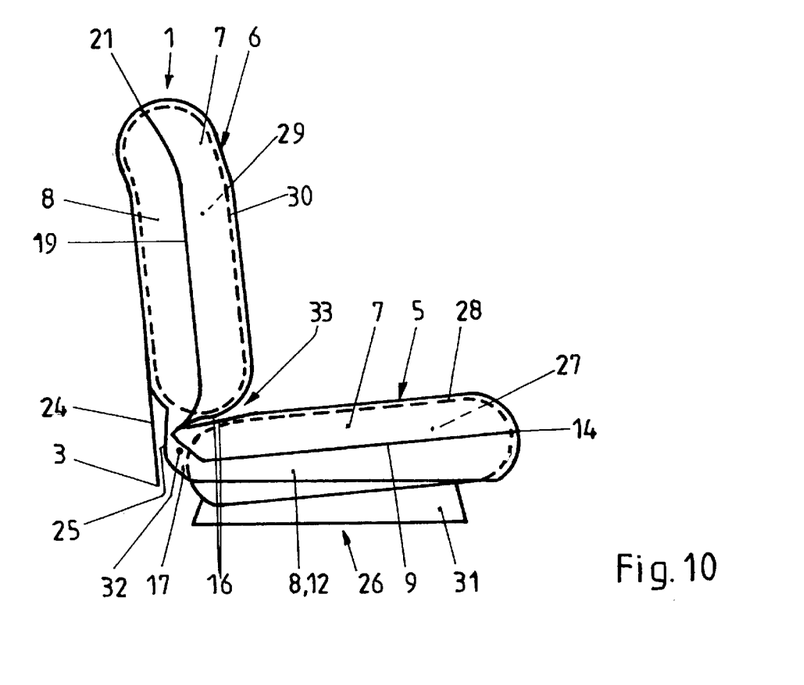
FIG. 10 is a side view to the seat cover of FIG. 1 mounted on a motor vehicle seat.

FIG. 10 illustrated the seat cover 1 in a position mounted on a vehicle seat 26. The seat 26 comprises a seat cushion 27 with seating 28. A backrest 29 is provided having a backrest surface 30 to receive the back of the user. The seat has a base 31 to be anchored in the vehicle. The backrest 29 is pivotably connected with the base 31 in known manner via link regions 32 to adjust differently inclined positions of the backrest 29. Between the part of the seating 28 being not usable for seating purposes and the adjacent part of the backrest 29 there is a gap 33 into which the fixing fold 16 is introduced manually or with a mounting plate after the seat pocket 5 and the backrest pocket 6 are put over the parts of the seat. The transverse welded seams 9 and 19 and the position of the protecting strip 12 covering and surrounding the side regions and the lower regions of the seat cushion 27 can be seen.

LIST OF REFERENCE NUMERALS

1 - seat cover
2 - arrow
3 - edge
4 - edge
5 - seat pocket
6 - backrest pocket
7 - front layer
8 - rear layer
9 - transverse welded seam
10 - perforation
11 - cutout
12 - protecting strip
13 - corner
14 - edge
15 - separating welded seam
16 - fixing fold
17 - protecting element
18 - perforation line
19 - transverse welded seam
20 - corner
21 - edge
22 - opening
23 - cutout
24 - protecting curtain
25 - protecting flaps
26 - seat
27 - seat cushion
28 - seating
29 - backrest
30 - backrest surface
31 - base
32 - link region
33 - gap

I claim:

1. A temporary seat cover for protecting a motor vehicle seat including a seat cushion having side surfaces, a backrest with link regions, and a clamping gap located between the seat cushion and the backrest, the vehicle including a seat belt, said seat cover comprising:

a front layer made of plastic film and extending along the seat cushion and the backrest;

a rear layer made of plastic film and connected to said front layer by transverse welding seams;

a backrest pocket for the reception of at least a part of the backrest, said backrest pocket being formed by said front layer and said rear layer and having a free rim;

a seat pocket for the reception of at least a part of the seat cushion, said seat pocket being formed by said front layer and said rear layer and having a free rim;

a protecting strip formed by a U-form cutout of said rear layer of said seat pocket and surrounding the side surfaces of the seat cushion;

a double-layered fixing fold to be clamped in the clamping gap, said double-layered fixing fold being formed by said front layer and separating welded seams;

two protecting elements to cover the link regions of the seat, said protecting elements being formed by said front layer and separating welded seams and configured such that each of said protecting elements can be inserted between the seat cushion and the backrest at one of the link regions.

2. The seat cover of claim 1, wherein said separating welded seams are laterally spaced apart from said transverse welded seams to limit the width of said fixing fold and the width of said protecting elements.

3. The seat cover of claim 2, wherein said double-layered fixing fold and said protecting elements of said front layer are exclusively connected by said transverse welded seams.

4. The seat cover of claim 1, wherein the part of said rear layer forming the backrest pocket is longer than the part of said front layer protecting the backrest, and said rear layer is configured to cover the side surface of the seat cushion.

5. The seat cover of claim 4, wherein the part of said rear layer forming said backrest pocket includes two cutouts spaced apart from said separating welded seams.

6. The seat cover of claim 4, wherein the part of said rear layer forming said backrest pocket has the same length as the sum of the length of the part of said front layer protecting the backrest and half of the length of said front layer forming said fixing fold.

7. The seat cover of claim 1, wherein said U-form cutout of said protecting strip is spaced apart from said separating welded seams.

8. The seat cover of claim 7, wherein said U-form cutout of said protecting strip extends into said free rim of said rear layer.

9. The seat cover of claim 1, wherein said front layer includes first and second perforation lines, each of said perforation lines arranged adjacent an opposite side surface of a cushion and each configured to place a portion of a seat belt therethrough.

10. The seat cover of claim 1, wherein said seat pocket includes chamfered corners.

11. The seat cover of claim 1, wherein said backrest pocket includes chamfered corners.

* * * * *